(12) United States Patent
Wildman et al.

(10) Patent No.: US 9,150,302 B2
(45) Date of Patent: Oct. 6, 2015

(54) PINNED LUG JOINT

(75) Inventors: Eric Wildman, Bristol (GB); Mohamed Saffique AdbulKader, Tamilnadu (IN)

(73) Assignee: Airbus Operations Limited, Bristol (GB)

( * ) Notice: Subject to any disclaimer, the term of this patent is extended or adjusted under 35 U.S.C. 154(b) by 1160 days.

(21) Appl. No.: 12/805,615

(22) Filed: Aug. 10, 2010

(65) Prior Publication Data

US 2011/0031349 A1  Feb. 10, 2011

(30) Foreign Application Priority Data

Aug. 10, 2009 (GB) .................................. 0913913.0

(51) Int. Cl.
*B64C 9/02* (2006.01)
*B64C 9/16* (2006.01)
*B64C 9/32* (2006.01)

(52) U.S. Cl.
CPC ...... *B64C 9/02* (2013.01); *B64C 9/16* (2013.01); *B64C 9/323* (2013.01); *Y02T 50/32* (2013.01); *Y10T 29/49826* (2015.01); *Y10T 403/32951* (2015.01)

(58) Field of Classification Search
CPC ......... B64C 9/02; B64C 9/16; F16C 11/0614; F16C 11/0666
USPC ........... 403/150, 157, 158; 244/130, 131, 213
See application file for complete search history.

(56) References Cited

U.S. PATENT DOCUMENTS

| 1,780,812 | A | * | 11/1930 | Burnelli .......................... 244/131 |
| 4,213,587 | A | * | 7/1980 | Roeseler et al. ................ 244/213 |
| 4,305,177 | A | * | 12/1981 | Feifel .............................. 244/215 |
| 6,371,681 | B1 | * | 4/2002 | Covington et al. ............ 403/158 |
| 8,002,489 | B2 | * | 8/2011 | Mahy et al. .................... 403/158 |
| 8,511,611 | B2 | * | 8/2013 | Blades ............................ 244/130 |
| 2004/0004162 | A1 | | 1/2004 | Beyer et al. |
| 2007/0252040 | A1 | | 11/2007 | Kordel et al. |
| 2010/0032520 | A1 | * | 2/2010 | Mauran et al. ................ 244/99.4 |

FOREIGN PATENT DOCUMENTS

| EP | 1 516 813 | 3/2005 |
| FR | 2 923 460 | 5/2009 |

OTHER PUBLICATIONS

Great Britain Search Report for GB Application No. 0913913.0, dated Nov. 23, 2009.

* cited by examiner

*Primary Examiner* — Daniel Wiley
(74) *Attorney, Agent, or Firm* — Nixon & Vanderhye P.C.

(57) ABSTRACT

A pinned lug joint comprising: a first part comprising two first lugs projecting from a bridge which extends between them; a second part pivotally coupled to the first part, the second part comprising a second lug positioned between the first lugs; and a sealing member, the sealing member being mounted to the first lugs and extending between them to seal an air gap between the second lug and the bridge at least when the second part is in a first position. The pinned lug joint may be used to attach a panel assembly to part of an aircraft.

12 Claims, 12 Drawing Sheets

PINNED LUG JOINT

This application claims priority to Great Britain Application No. 0913913.0, filed 10 Aug. 2009, the entire contents of which is hereby incorporated by reference.

FIELD OF THE INVENTION

The present invention relates to a pinned lug joint, a method of reducing air flow through a pinned lug joint and a method of reducing drag on an aerodynamic surface.

BACKGROUND OF THE INVENTION

Spoilers are typically provided on the upper aerodynamic surface of an aircraft wing, between the main fixed wing box and the trailing edge flaps. The performance of the flaps can be improved by attaching them to the fixed wing box by drop hinge mechanisms. This allows the flaps to be deployed in both aft and downward directions and to be rotated downwardly (or "drooped"). When the flaps are fully deployed in this way, gaps are formed between the trailing edges of the spoilers and the leading edges of the flaps. Small air gaps in these regions improve lift when compared to conventional Fowler flaps. However, if these gaps are too large and the continuity of the upper aerodynamic surface is not maintained, then the performance of the flaps is reduced. To control the size of these gaps, the spoilers are rotated downwardly (or "drooped") when the flaps are fully deployed (e.g. during take-off).

The spoilers are typically attached to the fixed wing box by structural ribs. Cut-out sections are provided on the leading edges of the spoilers to prevent clashing between the spoilers and the ribs when the spoilers are deployed to a braking position. However, particularly when the spoilers are in their drooped positions, these cut-out sections become exposed. When the flaps are deployed, voids are opened on the high pressure lower surface of the wing. This can lead to crossbleed air flowing from the high pressure lower surface, through air gaps in the joints between the structural ribs and the spoilers, and through the cut-out sections to the low pressure upper surface. This leads to a reduction in lift. Also, when the spoilers are in their cruise positions, the cut-out sections act as discontinuities in the path of the air flow, increasing drag and noise. Consequently, for optimum performance, these air gaps need to be sealed, while allowing the spoilers to rotate over their entire pivotal range without clashing with the structural rib.

SUMMARY OF THE INVENTION

A first aspect of the invention provides a pinned lug joint comprising: a first part comprising two first lugs projecting from a bridge which extends between them; a second part pivotally coupled to the first part, the second part comprising a second lug positioned between the first lugs; and a sealing member, the sealing member being mounted to the first lugs and extending between them to seal an air gap between the second lug and the bridge at least when the second part is in a first position. Preferably, the sealing member seals the air gap between the second lug and the bridge throughout the pivotal range of the second part.

Preferably, the sealing member comprises: a first flange which extends between one of the first lugs and the second lug to seal an air gap between them; and a second flange which extends between the other first lug and the second lug to seal an air gap between them. It is also preferable that the sealing member is mounted to one of the first lugs with a first mounting portion and to the other first lug with a second mounting portion, wherein the first and second flanges form part of the first and second mounting portions respectively.

The sealing member may be made from, for example but not exclusively, an elastomer such as polyurethane or neoprene. Moreover, the mounting portions are optionally reinforced by, for example but not exclusively, a metallic, cloth or carbon fibre reinforcement element in order to increase the stiffness of the seal where it contacts the first lugs. It is preferable that the portion of the seal which extends between the first lugs includes a less stiff reinforcement than the mounting portions, or no reinforcement at all.

A second aspect of the invention provides a pinned lug joint comprising: a first lug pivotally coupled to a second lug; and a seal mounted on one of the lugs, the seal comprising a flange which extends between the first and second lugs to seal an air gap between them. Preferably, the flange is shaped to conform to an outer contour of the lug on which the seal is mounted. It is also preferable that the flange is a substantially flat projection which extends from a web of the seal.

A third aspect of the invention provides a panel assembly connected to part of an aircraft by the joint of the first or second aspects of the invention, the panel assembly comprising: a panel with a cut-out section; and a resilient sealing member attached to the panel and positioned in the cut-out section. Where the panel assembly is connected to part of an aircraft by the joint of the first aspect of the invention, it is preferable that the second lug extends from the cut-out section of the panel, the cut-out section providing a clearance between the first part and the second part at least when the second part is pivoted to a second position. It is also preferable that the resilient sealing member is elastomeric.

A fourth aspect of the invention provides a panel assembly comprising: an aerodynamic surface pivotally coupled to part of an aircraft by a hinge fitting, the surface comprising a cut-out section to avoid clashing with the hinge fitting when the surface is pivoted to a first position; and a sealing member attached to the aerodynamic surface and positioned in the cut-out section to at least partially fill the cut-out section at least when the aerodynamic surface is pivoted to a second position.

A fifth aspect of the invention provides a method of reducing drag on an aerodynamic surface, the aerodynamic surface being pivotally coupled to part of an aircraft by a hinge fitting, the surface comprising a cut-out section to avoid clashing with the hinge fitting when the surface is pivoted to a first position, the method comprising attaching a sealing member to the aerodynamic surface and positioning the sealing member in the cut-out section to at least partially fill the cut-out section at least when the aerodynamic surface is pivoted to a second position. Preferably the sealing member is resilient and the method further comprises compressing the sealing member when the aerodynamic surface is pivoted to the first position. It is also preferable that, when the aerodynamic surface is pivoted from the first position to the second position, the seal relaxes to its original shape.

A sixth aspect of the invention provides a method of reducing air flow through a pinned lug joint, the joint comprising a first part pivotally coupled to a second part, the second part comprising two second lugs projecting from a bridge which extends between them, and the first part comprising a first lug positioned between the lugs of the second part, the method comprising: sealing a first air gap between the first lug and the bridge of the second part at least when the first part is in a predetermined position; and/or sealing a second air gap between the first lug and one of the second lugs; and/or sealing a third air gap between the first lug and the other second lug. Preferably, the first part comprises a panel with a cut-out section from which the first lug extends, the method further comprising at least partially sealing a fourth air gap in the cut-out section of the panel.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
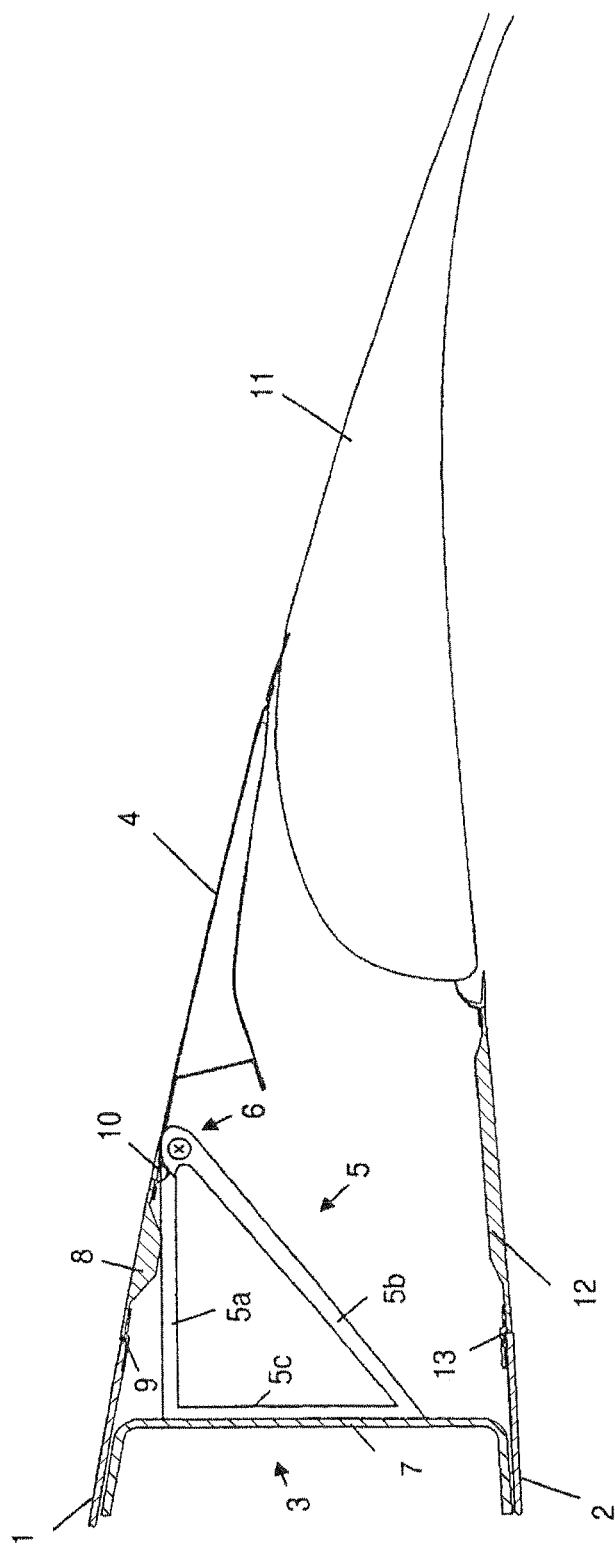
FIG. 1 is a schematic cross-sectional view through the trailing edge of an aircraft wing.

FIG. 1 shows a schematic cord-wise cross sectional view through the trailing edge of an aircraft wing. The aircraft wing comprises a fixed wing box comprising upper and lower covers 1, 2 which are bolted to, and extend between, a front spar (not shown) and a rear spar 3. A spoiler 4 with a radiused leading edge is pivotally attached to a structural rib 5 which comprises an upper arm 5a, a lower arm 5b and a foot 5c. The leading edge of the upper arm 5a is joined at right angles to the upper edge of the foot 5c, while the lower arm 5b extends between, and is joined at acute angles to, the lower edge of the foot 5c and the aft edge of the upper arm 5a. A clevis fitting 6 is formed at the join between the upper and lower arms 5a, 5b. The foot 5c of the structural rib 5 is bolted to the web 7 of the rear spar 3, while the upper arm 5a is bolted to an upper panel 8 which extends from the aft edge of the upper cover 1 and is attached thereto by a butt-strap 9. A flexible wedge seal 10 is fitted across the entire span of the leading edge of the spoiler and fastened to the panel 8 to seal an air gap between the radiused leading edge of the spoiler 4 and the aft edge of the panel 8.

A flap 11 is positioned directly aft of the spoiler 4. The flap 11 is pivotally attached to the wing box by a drop-hinge mechanism (not shown). A lower panel 12 is attached to the aft edge of the lower cover 2 by a butt-strap 13 and extends therefrom to seal a gap between the lower cover 2 and the flap 11. It is noted that the spoiler 4 and the flap 11 are movable aerodynamic surfaces, both of which are shown in their retracted positions in FIG. 1.

Figure 2:
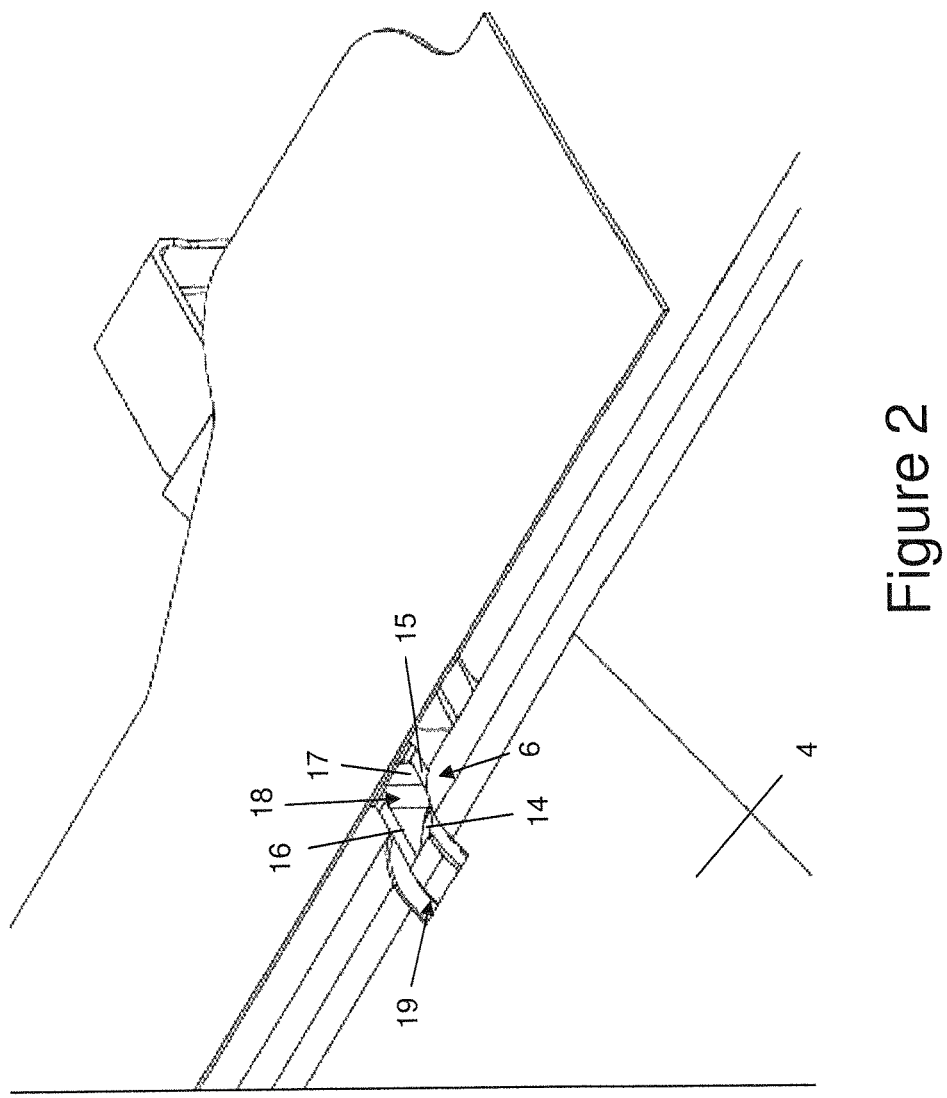
FIG. 2 is a perspective view of a pinned lug joint between a spoiler lug and a clevis fitting.

As shown in FIG. 2, the spoiler 4 has a lug 14 extending from its leading edge which is positioned between two clevis lugs 15, 16 extending from a bridge 17 of the clevis fitting 6. A clevis pin (not shown) extends between the two clevis lugs 15, 16 through a central bore in the spoiler lug 14 to define an axis about which the spoiler can be pivoted. An air gap 18 exists between the leading edge of the spoiler lug 14 and the aft edge of the clevis bridge 17. Moreover, the spoiler 4 has a cut-out section 19 in its radiused leading edge around the proximal end of the lug 14. This will be explained below.

Figure 3:
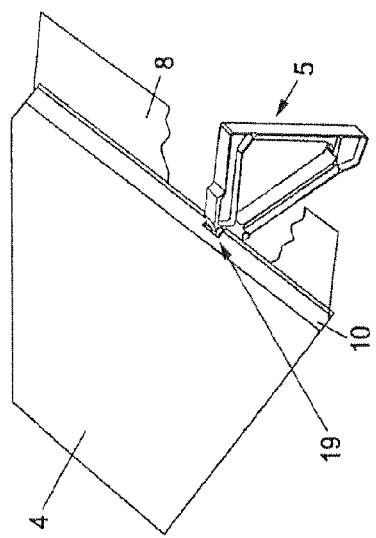
FIGS. 3-5 show the trailing edge of the wing of FIG. 1 with the spoiler in braking, cruise and drooped positions respectively.
Figure 4:
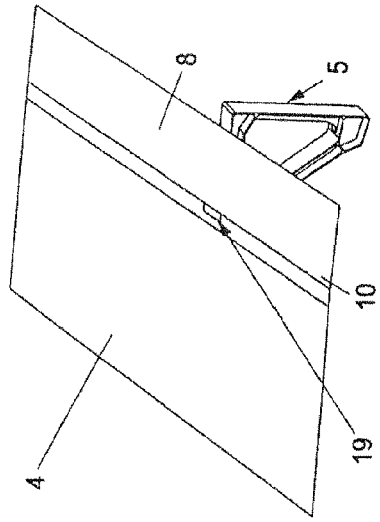
Figure 5:
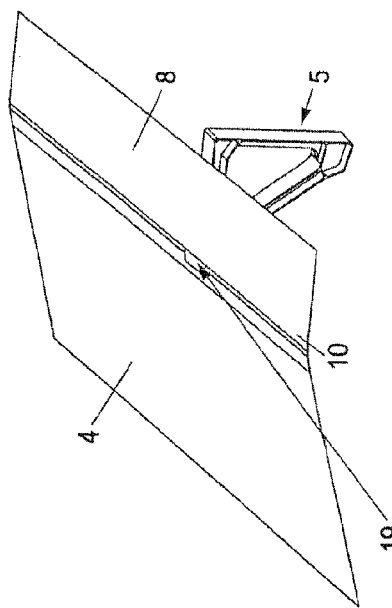

As illustrated most clearly in FIGS. 3-5, the spoiler 4 can be pivoted about a relatively wide pivotal range. FIG. 4 shows the spoiler 4 in its cruise (or retracted) position, where it is substantially parallel to the upper panel 8. For example but not exclusively, relative to the cruise position shown in FIG. 4, the spoiler may be pivoted anticlockwise about an angle of up to −15° to a drooped position (see FIG. 5). In this position, as described above in the Background section, the drooped spoiler controls an air gap between the spoiler trailing edge and the leading edge of the flap 11 to ensure that high lift is achieved. Additionally, the spoiler 4 may be pivoted clockwise about an angle of up to +55° (again relative to the position shown in FIG. 4) to a braking position (see FIG. 3). In this position, the spoiler significantly reduces lift and also increases drag.

In FIGS. 3-5, the wedge seal 10 which extends from the aft edge of the panel 8 is shown schematically as a single part with the panel 8. As shown in FIG. 3, when the spoiler is deployed to the braking position, its radiused leading edge pivots beneath the seal 10 and the cut-out section is partially filled by the clevis fitting 6. The panel 8 is shown in a cut-away view in FIG. 3 to show the structural rib 5 for purposes of illustration. In the position shown in FIG. 3, the flexible wedge seal 10 curves upwards where it comes into contact with the upper surface of the spoiler 4. The cut-out section 19 prevents a clash between the radiused leading edge of the spoiler 4 and the clevis fitting 6. As the cut-out section 19 is pivoted beneath the wedge seal 10, which forms an air tight seal where it contacts the upper surface of the spoiler, the cut-out section 19 is not exposed to air flow in this position. In the spoiler cruise position shown in FIG. 4, the radiused leading edge of the spoiler 4 remains partially beneath the seal 10. The seal 10 only partially fills the cut-out section 19 which is thus partially exposed to air flow in this position. In the spoiler drooped position shown in FIG. 5, the radiused leading edge is pivoted to a position where only a very small part of the spoiler leading edge (if any) remains beneath the seal 10. Thus, the cut-out section 19 is fully exposed to the air flow in this position.

Figure 6:
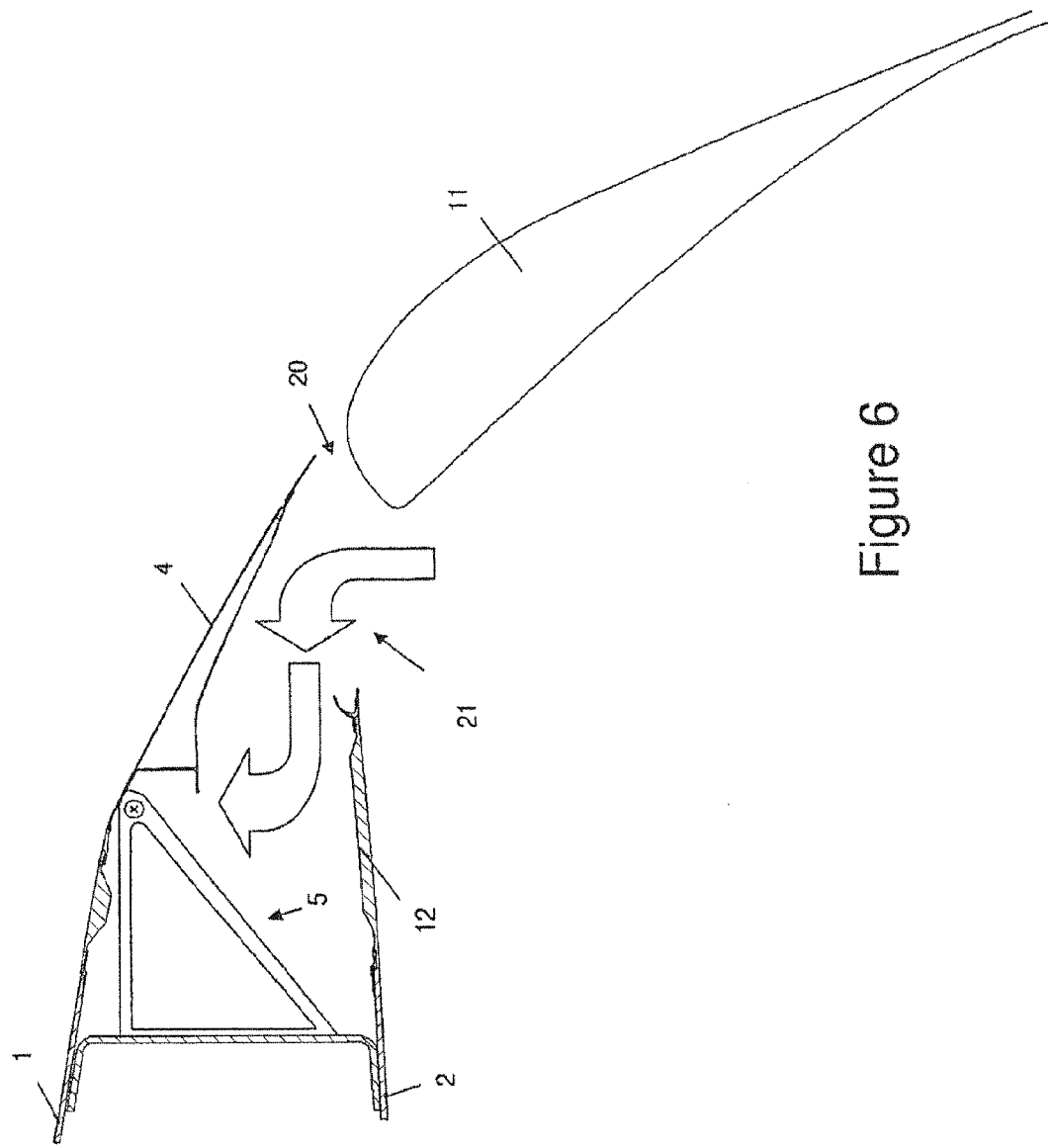
FIG. 6 shows the cross sectional view of FIG. 1 with the spoiler and flap in their drooped positions.

Referring now to FIG. 6, during take-off the flap 11 is deployed in both aft and downward directions and also rotated downwardly (or "drooped"). As explained above, the spoiler 4 is also deployed to its drooped position during take-off to reduce the size of the air gap 20 between the leading edge of the flap 11 and the aft edge of the spoiler 4. The deployment of the flap 11 opens a void 21 in the lower surface of the wing through which high pressure air can flow into the wing from the lower surface (see block arrows in FIG. 6). In order to maintain high lift, air must not be allowed to flow through the wing from the high pressure air flow on its lower surface to the low pressure air flow on its upper surface other than through the gap 20.

Figure 7:
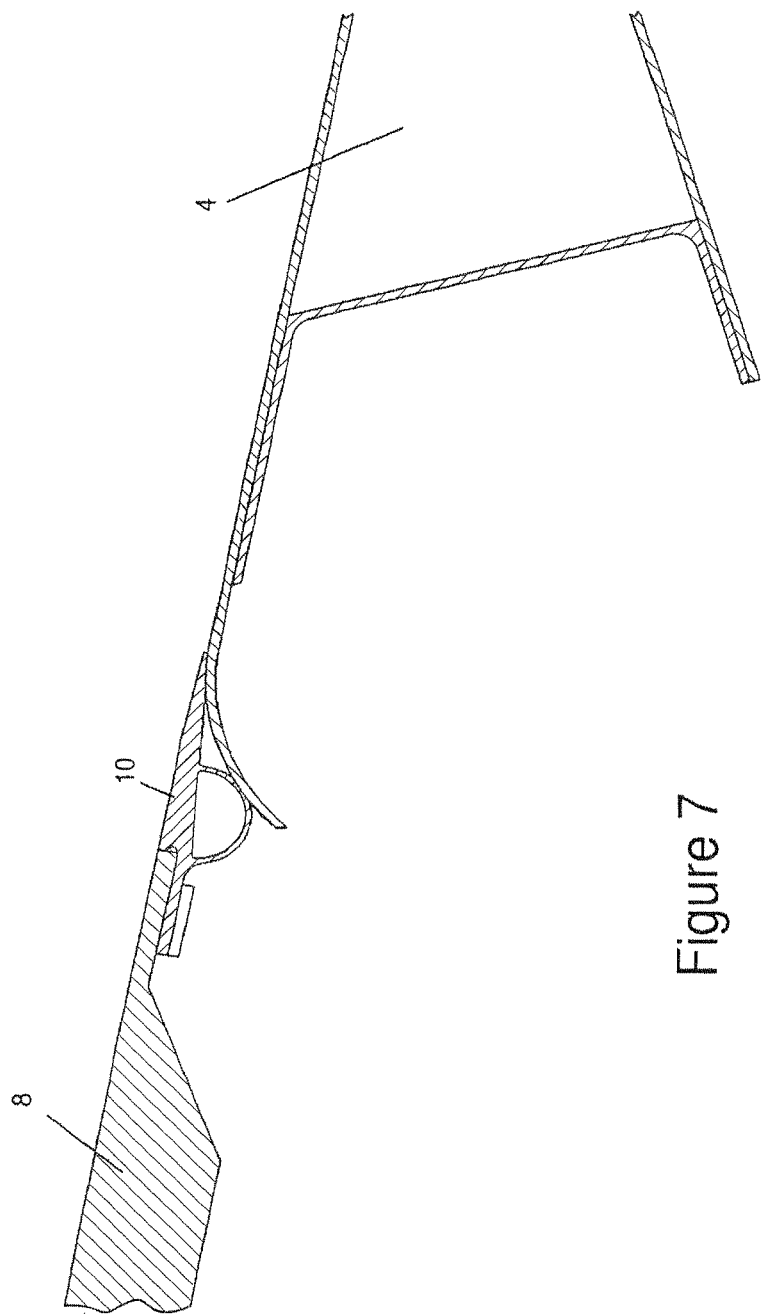
FIG. 7 is a close up cross sectional view of a wedge seal between the spoiler and the upper panel.

FIG. 7 is a close up cord-wise sectional view through the junction between the leading edge of the spoiler 4 and the trailing edge of the upper panel 8, inboard of the structural rib 5. As mentioned above, the wedge seal 10 seals the span-wise air gaps between the spoiler leading edge and the panel trailing edge across the entire span of the spoiler leading edge. The wedge seal 10 is biased towards the spoiler 4 such that these air gaps are sealed across the entire pivotal range of the spoiler 4. However, as explained above with reference to FIG. 5, the wedge seal 10 does not seal the air gap created by the cut-out section 19 in the radiused leading edge of the spoiler 4 when the spoiler is drooped. Therefore, when the spoiler is in the drooped position, air can flow from the void 21 in the lower surface through air gaps between the clevis fitting 6 and the spoiler lug 14 and through the cut-out 19 to the upper surface of the wing. As this would reduce lift, the cut-out 19 and the air gaps between the clevis fitting 6 and the spoiler lug 14 must therefore be sealed to maintain high lift when the spoiler is drooped.

Figure 8:
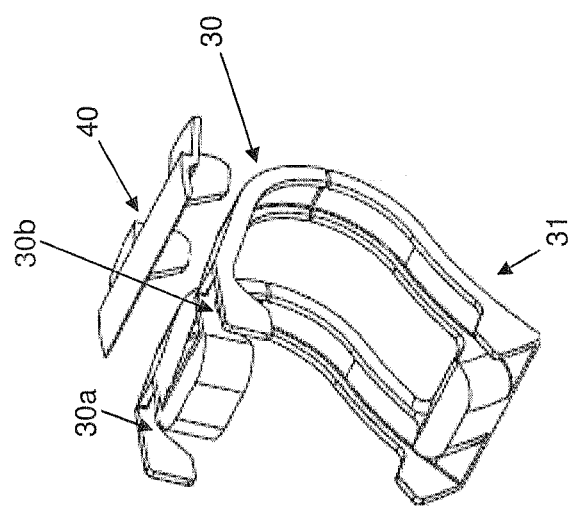
FIG. 8 is a perspective view of a three-part seal.

FIG. 8 shows a three part seal comprising upper and lower seals 30, 31 and a resilient blade seal 40. The upper and lower seals 30, 31 can be used to seal the air gaps between the clevis fitting 6 and the spoiler lug 14, while the blade seal 40 can be used to at least partially seal the cut-out 19. This is explained in detail below.

Figure 9B:
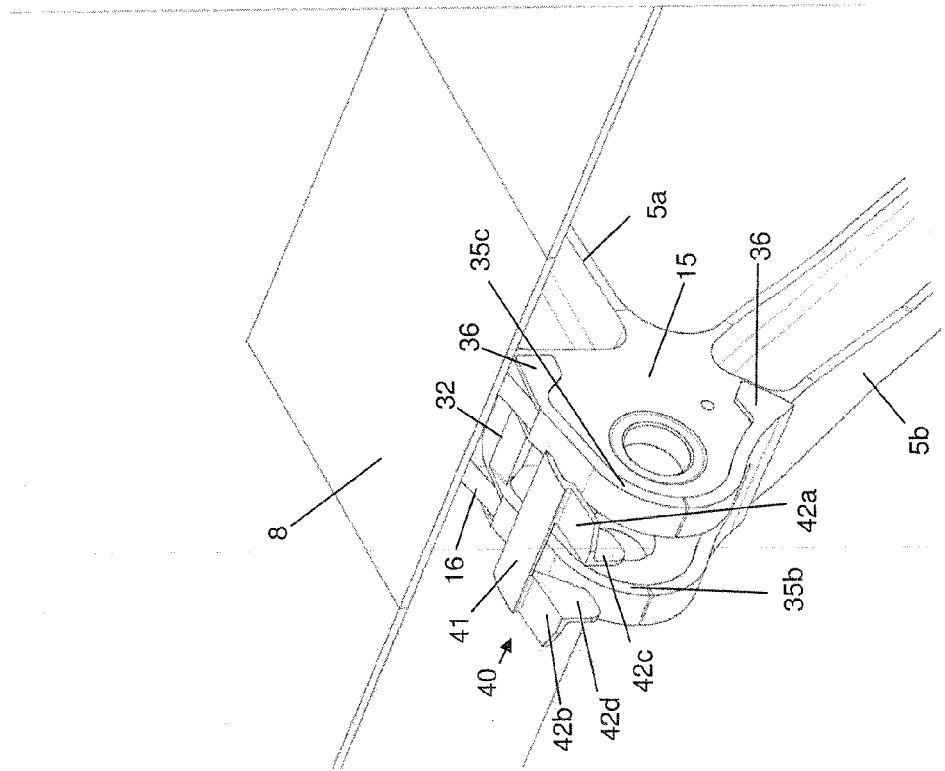
FIGS. 9a-b are close-up perspective views of a clevis fitting and the three-part seal of FIG. 8, part of which is fitted to the clevis fitting.
Figure 9A:
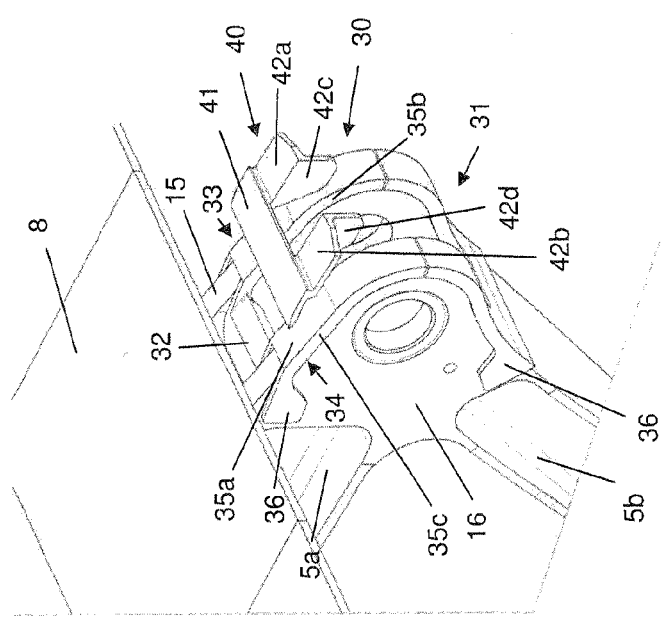

FIGS. 9a, 9b are close up perspective views of the clevis lugs 15, 16 of the structural rib 5. The spoiler lug 14 and the spoiler 4 are omitted for clarity. The upper and lower seals 30, 31 are fitted onto the clevis lugs 15, 16. As the upper and lower seals are similar, only the upper seal 30 will be described in detail. The upper seal 30 comprises a bridge seal 32 which extends between two mounting portions 33 and 34 which are mounted on the lugs 15, 16 respectively. The bridge 32 is resilient and seals the air gap 18 (shown in FIG. 2) between the spoiler lug 14 and the bridge 17 on the upper side of the clevis fitting 6. The mounting portions 33, 34 each comprise a central web 35a and inner and outer flanges 35b, 35c. The flanges 35b, 35c are substantially flat projections which extend perpendicularly from opposite ends of the web 35a. The web 35a and the flanges 35b, 35c are shaped to follow the outer contour of the clevis lugs 15, 16 and are attached to the lugs 15, 16 with adhesive. The outer flanges 35c each have extended portions 36 which help to secure the seals 30, 31 to the clevis lugs 15, 16. As well as helping to hold the upper seal 30 on the lugs 15, 16, the inner flanges 35b of the mounting portions 33 and 34 also perform a sealing function. In particular, when the spoiler lug 14 is attached to the clevis lugs 15, 16, bushes (not shown) are positioned between the spoiler lug and each of the clevis lugs. This creates air gaps between the spoiler lug 14 and each of the clevis lugs 15, 16. The inner flanges 35b of the upper seal 30 are sized to seal the air gaps between the spoiler lug 14 and the upper halves of the clevis lugs 15, 16.

Figure 10:
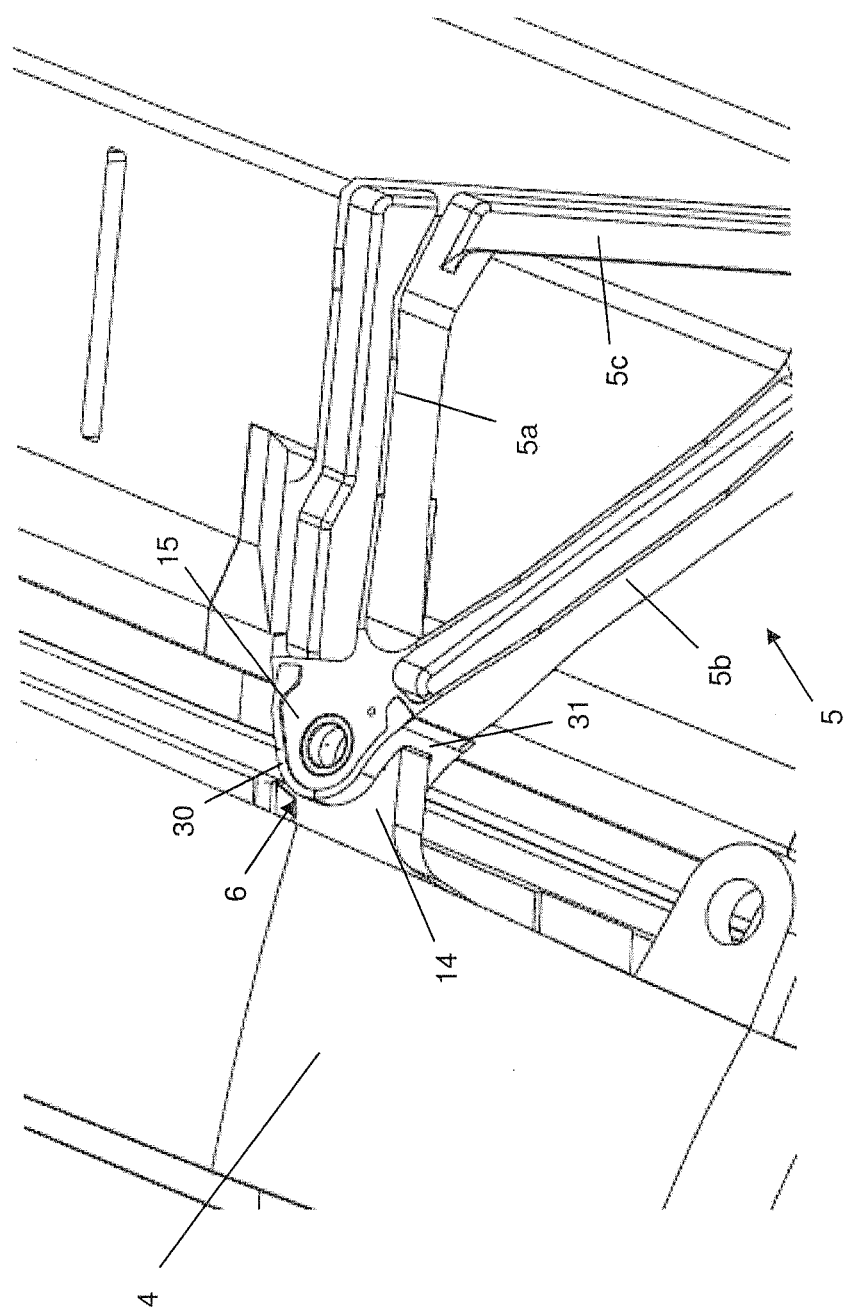
FIG. 10 is a perspective view of the underside of the joint between a spoiler lug and the clevis fitting of FIGS. 9a-b with the three-part seal fitted to the joint.

FIG. 10 is a perspective view of the underside of the joint between the spoiler lug 14 and the clevis fitting 6 of the structural rib 5 with the upper and lower seals 30, 31 fitted. This view clearly shows the lower seal 31 which, as discussed above, is similar to the upper seal 30. The lower seal 31 seals the air gap between the leading edge of the spoiler lug 14 and the bridge 17 on the lower side of the clevis fitting and the air gaps between the spoiler lug 14 and the lower halves of the clevis lugs 15, 16. Note that (as shown most clearly in FIG. 8) the upper seal 30 has gaps 30a and 30b between its respective mounting portions 33, 34 and the bridge seal 32. This allows the wedge seal 10 to be mounted on the upper surfaces of the clevis lugs 15, 16 without being impeded by the upper seal 30. It is not necessary for such gaps to be incorporated in the lower seal 31.

As the spoiler lug 14 has a constant radius over its pivotal range as it rotates about the clevis pin, the external surface of the lug remains in contact with the bridge seals of both the upper seal 30 and the lower seal 31 throughout its pivotal range (e.g. −15° to +55°). Alternatively, the spoiler lug 14 may contact the bridge seal of only one of the upper and lower seals 30, 31 at any given position in the spoiler's pivotal range. When the spoiler is in the drooped position, the bridge of the lower seal 31 may be compressed against the clevis bridge 17. Likewise, when the spoiler is deployed to its braking position, the bridge of the upper seal 30 may be compressed against the clevis bridge 17. However, as mentioned above, the resilient seals 30, 31 expand back to their original size when they are relaxed in the intermediate positions.

The upper and lower seals may be made from, for example but not exclusively, an elastomer such as polyurethane or neoprene. Optionally, the seals may be reinforced by, for example but not exclusively, a metallic, cloth or carbon fibre reinforcing element which can be moulded into the seals to increase their stiffness. The reinforcement is particularly desirable in the mounting portions of the upper and lower seals in order to provide added stiffness where the upper and lower seals 30, 31 contact the clevis fitting 6. Less reinforcement (if any) is preferably applied to the bridge seals which come into contact with the spoiler lug 14.

By sealing the air gaps in the clevis fitting 6 with separate upper and lower seals 30, 31, installation of the seal is simplified. The seals can also be retrofitted to existing structural rib assemblies. It is noted that the upper and lower seals 30, 31 could alternatively be formed from a single part.

As mentioned above, the resilient blade seal 40 (shown in FIGS. 8, 9a-b) can be used to at least partially seal the cut-out 19 in the leading edge of the spoiler 4. The blade seal 40 comprises a sealing portion 41 and a mounting portion 42. The sealing portion 41 is positioned in the cut-out section 19, to reduce air flow through the cut-out. The mounting portion 42 is used to attach the seal 40 to the spoiler 4. In particular, the mounting portion comprises a pair of seats 42a, b, which are attached to the underside of the spoiler immediately aft the cut-out 19, and a pair of flanges 42c, d which are attached to the spoiler leading edge profile. As explained above with reference to FIGS. 3-5, the size of the exposed portion of the cut-out section 19 in the spoiler varies over the pivotal range of the spoiler. The blade seal is resilient to enable it to be compressed when the spoiler is pivoted to its braking position (see FIG. 3), thus allowing the cut-out section to be partially filled by the clevis fitting 6, and to relax and expand back to its original size when the spoiler is pivoted back to its cruise (see FIG. 4) and drooped positions (see FIG. 5). The blade seal 40 may be made from an elastomer such as polyurethane or neoprene. In this case, in order to maximise its flexibility, it is less desirable to reinforce the blade seal 40 by a reinforcing element (although some reinforcement may be applied). Indeed, due to the limitations in the flexibility of the material used to make the seal (and depending on the pivotal range of the spoiler), it may not be possible to have a blade seal 40 which compresses sufficiently to allow the spoiler to be pivoted up fully to its braking position (where the cut-out section is partially filled by the clevis fitting 6) and which also relaxes to completely fill the cut-out section 19 when the spoiler is in the drooped position (where the cut-out section is fully exposed) even when no reinforcement is applied. The blade seal 40 may thus only partially fill the cut-out section 19 in the drooped position. When the spoiler is in the cruise position, the cut-out section 19 is completely sealed, mostly by the blade seal 40 and partially by the aft edge of the wedge seal 10. This will be described further below.

Figure 11:
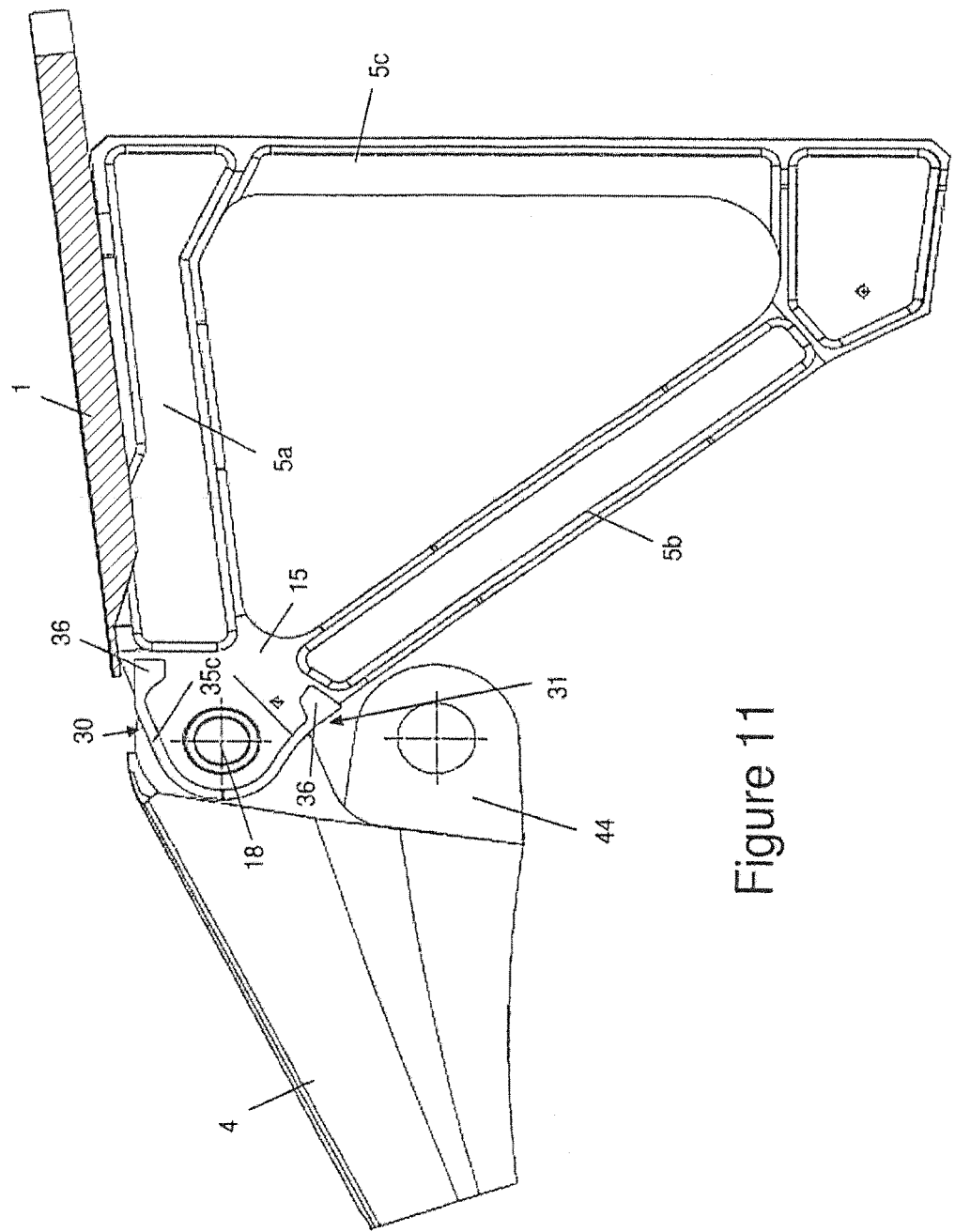
FIG. 11 is a side view of the pinned lug joint of FIG. 2 with the spoiler in the drooped position and the three-part seal fitted to the joint.
Figure 12:
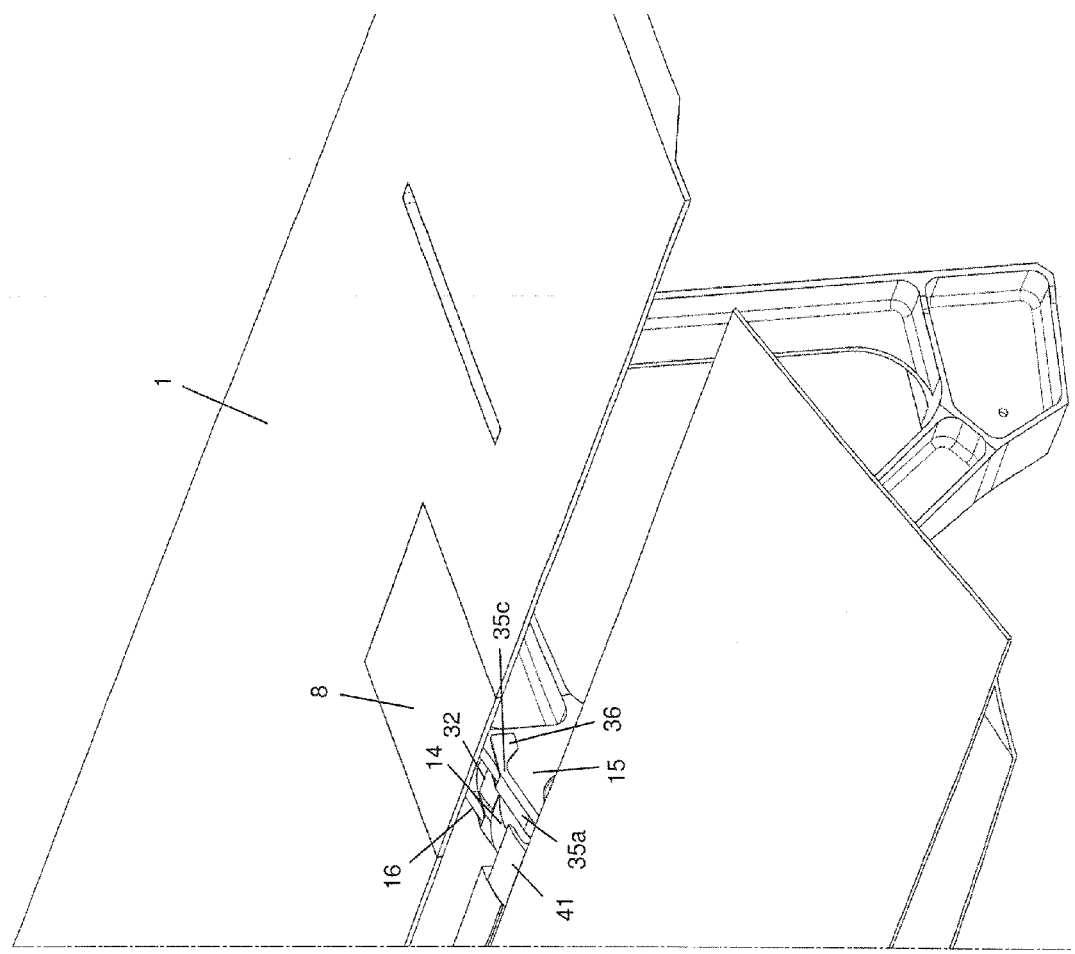
FIG. 12 is a perspective view of the pinned lug joint of FIGS. 2 and 9, again with the spoiler in the drooped position and the three-part seal fitted to the joint.

FIGS. 11 and 12 show the junction between the spoiler 4 and the upper panel 8 with the spoiler 4 in the drooped position and the seals 30, 31 and 40 attached to the clevis fitting and the spoiler respectively. The flap 11, the wedge seal 10 and part of the leading edge of the spoiler are omitted for clarity. An actuator bracket 44 is shown in FIG. 11. This provides an attachment point for an actuator (not shown) which controls the pivoting of the spoiler about the clevis pin. As described above with reference to FIG. 6, when the spoiler is drooped, air can flow into the wing through the void 21 between the lower panel 12 and the deployed flap 11 towards the structural rib 5. In this case, air flow through the clevis joint will be substantially blocked by the bridge of the lower seal 31. Any air which penetrates the bridge of the lower seal 31 will be blocked by the bridge of the upper seal 30. Air flow between the spoiler hinge lug 14 and the clevis lugs 15, 16 will be blocked by the inner flanges 35b of the mounting portions of both the upper and lower seals 30, 31. Additionally, the cut-out section 19 in the spoiler 4 is partially filled by the blade seal 40, thus significantly reducing air flow through the cut-out section 19. Alternatively, the cut-out section 19 may be sealed completely by the blade seal 40 (and optionally by the wedge seal 10). Thus, cross bleed air flow between the lower and upper surfaces of the wing is significantly reduced if not eliminated when the spoiler is in the drooped position.

Figure 13:
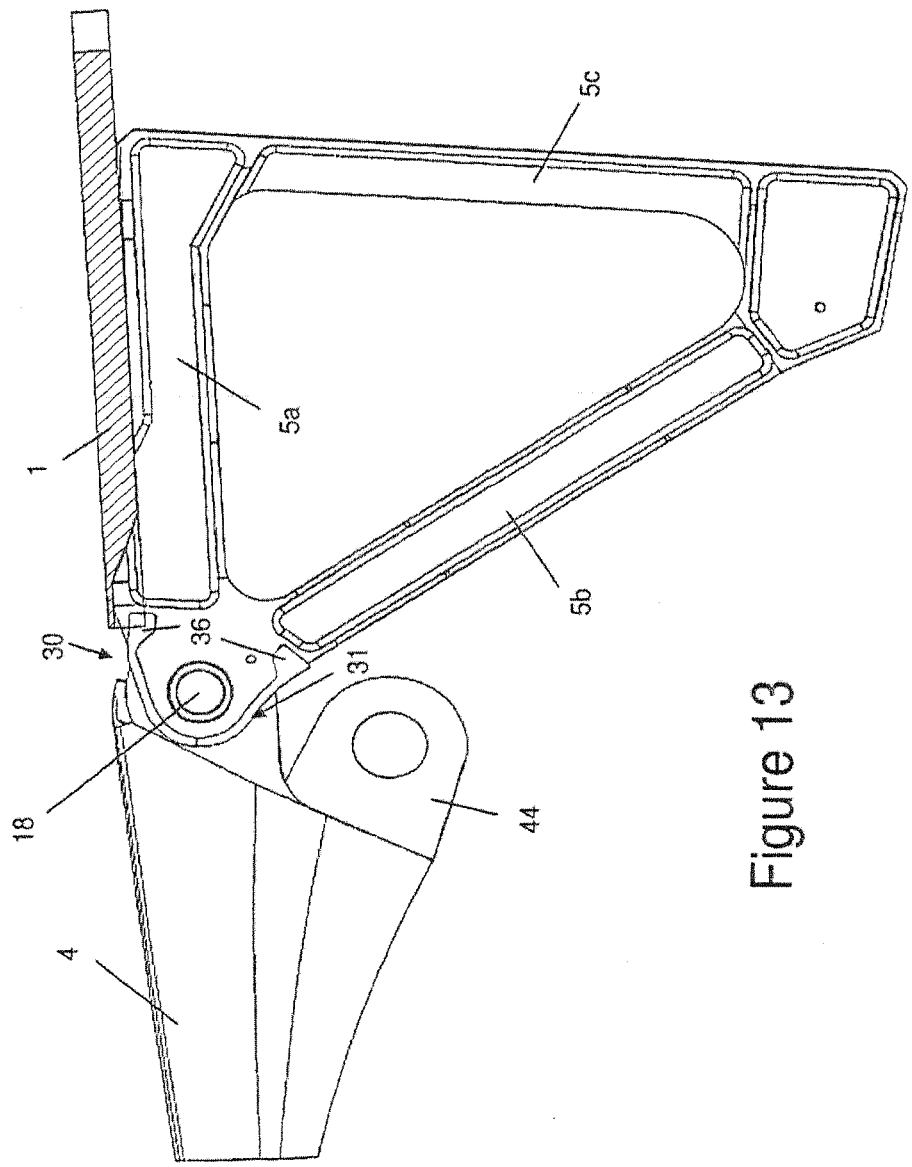
FIG. 13 is a side view of the pinned lug joint of FIG. 2 with the spoiler in the cruise position and the three-part seal fitted to the joint.
Figure 14:
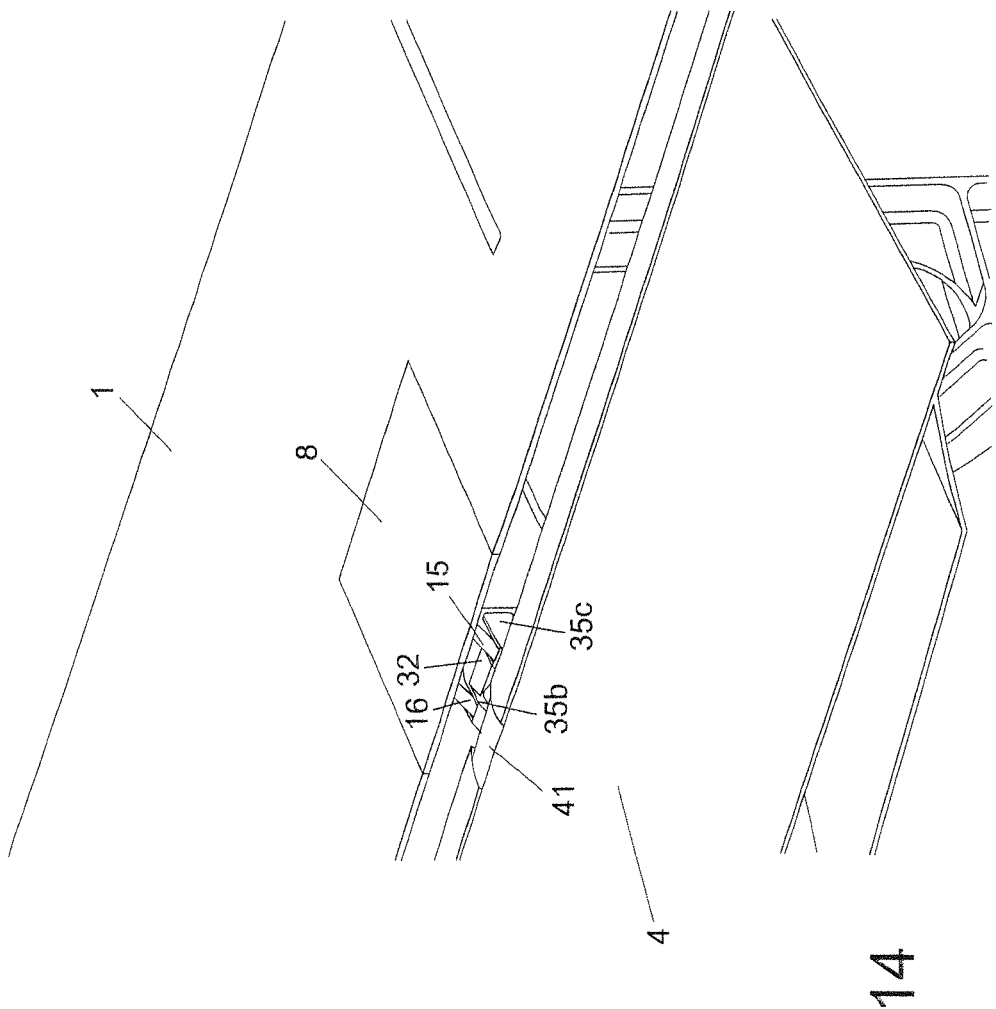
FIG. 14 is a perspective view of the pinned lug joint of FIGS. 2 and 11, again with the spoiler in the cruise position and the three-part seal fitted to the joint.

FIGS. 13 and 14 show the spoiler in its cruise position. Here, as mentioned above, the blade seal 40 and the wedge seal 10 together completely fill the cut-out section 19 of the spoiler 4. In the cruise position, the void 21 in the lower surface of the wing is closed (see FIG. 1) and so no air flows into the wing from the high pressure lower surface. However, the seals 10, 40 remove the discontinuity in the upper aerodynamic surface caused by the cut-out section 19. This ensures that the air flow over the upper aerodynamic surface of the panel/spoiler junction is continuous, thus reducing drag and noise.

Sealing of hinge slots at the edge of moveable aircraft panels is not limited to flight control surfaces and is an issue elsewhere on aircraft, e.g. landing gear bay doors. The seals described above are also applicable to these applications.

Although the invention has been described above with reference to one or more preferred embodiments, it will be appreciated that various changes or modifications may be made without departing from the scope of the invention as defined in the appended claims.

The invention claimed is:

1. A pinned lug joint comprising:
a first part comprising two first lugs projecting from a lug bridge which extends between them;
a second part pivotally coupled to the first part, the second part comprising a second lug positioned between the two first lugs; and
a sealing member, the sealing member being mounted to the two first lugs, and extending from the lug bridge to contact the second lug to seal an air gap between the second lug and the lug bridge at least when the second part is in a first position,
the sealing member includes two mounting portions each mounted to a respective one of the two first lugs and a sealing member bridge connecting the two mounting portions, wherein the mounting portions each include a web seated on an outer surface of the respective one of the two first lugs and a flange extending from an edge of the web between the respective one of the two first lugs and the second lug, and
the sealing member bridge includes a web extending between the two mounting portions and extending between the lug bridge and second lug when the second part is in the first position.

2. The pinned lug joint of claim 1 wherein the two first lugs are pivotally coupled to the second lug by a pin having a pin axis.

3. The pinned lug joint of claim 1 wherein in each of the two mounting portions the web is shaped to conform to the outer surface of the respective one of the two first lugs and the flange is a first flange, and the two mounting portions each further comprise a second flange projecting from a second edge of the web of the respective mounting portion.

4. The pinned lug joint of claim 1 wherein the flange is a substantially flat projection.

5. A pinned lug joint and panel assembly for an aircraft comprising:
a first panel including a first edge;
a second panel including a second edge parallel and juxtaposed to the first edge, wherein a cut-out section is in the second panel and extends to the second edge;
a pinned lug joint including two first lugs, a second lug and a pin, wherein the two first lugs project from the first panel, beyond the first edge and into the cut-out section; the second lug projects from the second panel, into the cut-out section and between the two first lugs; and the pin extends through the two first lugs and the second lug;
a seal assembly including two mounting portions and a seal assembly bridge connecting the two mounting portions, wherein the mounting portions each include a web seated on an outer surface of the respective one of the two first lugs and a flange extending from an edge of the web to between the respective one of the two first lugs and the second lug and the seal assembly bridge extends from a lug bridge connecting the two first lugs and an edge of the cut-out section while the second panel is in a first position; and
a resilient bridge seal attached to the second panel and the bridge seal includes a panel positioned in the cut-out section.

6. The pinned lug joint and panel assembly of claim 5 wherein the cut-out section provides a clearance between the first panel and the second panel at least when the second panel is pivoted about the pin to a second position.

7. The pinned lug joint and panel assembly of claim 5 wherein the resilient bridge seal is elastomeric.

8. The pinned lug joint and panel assembly of claim 5 wherein the first panel is an aerodynamic surface, and the cut-out section in the second panel is arranged to avoid clashing with the pinned lug joint when the aerodynamic surface is pivoted to the first position; and the resilient bridge seal is arranged to at least partially fill the cut-out section at least when the aerodynamic surface is pivoted to a second position.

9. A pinned lug joint comprising:
a first panel comprising two first lugs projecting from an edge of the first panel, each of the two first lugs comprising an arcuate peripheral surface substantially parallel to the edge, the arcuate peripheral surface bounded by opposing flat sides substantially perpendicular to the edge, wherein a through-hole is formed between the opposing flat sides of each of the first two lugs;
a second panel pivotally coupled to the first panel, the second panel comprising a cut-out section formed at an outer edge of thereof facing the two first lugs, wherein a second lug is formed within and extends outwardly from the cut-out section, the second lug comprising opposing flat sides with a through-hole formed between the opposing flat sides, wherein the second lug is positioned between the two first lugs;

a clevis pin extending through the through-holes of the two first lugs and the through-hole of the second lug; and a sealing member, the sealing member comprising first and second mounting portions connected by a bridge, the first and second mounting portions each comprising a central web configured to engage the respective arcuate peripheral surfaces of the two first lugs, each of the first and second mounting portions further comprising inner and outer flanges projecting from the central web thereof and respectively engaging the opposing flat sides of the two first lugs, wherein the inner flanges of the first and second mounting portions extend between one of the two first lugs and the second lug, and between the second lug and the other of the first two lugs, respectively, to seal an air gap therebetween at least when the second panel is in a first position.

10. The pinned lug joint of claim 9 further comprising a resilient second sealing member attached to the second panel and positioned in the cut-out section.

11. The pinned lug joint of claim 10 wherein the resilient second sealing member is elastomeric.

12. The pinned lug joint of claim 9 wherein the cut-out section provides a clearance between the first panel and the second panel at least when the second panel is pivoted to a second position.

* * * * *